(12) United States Patent
Morein

(10) Patent No.: US 6,452,602 B1
(45) Date of Patent: Sep. 17, 2002

(54) METHOD AND APPARATUS FOR STORING COMPRESSED DATA

(75) Inventor: Stephen L. Morein, Cambridge, MA (US)

(73) Assignee: ATI International Srl (BB)

( * ) Notice: Subject to any disclaimer, the term of this patent is extended or adjusted under 35 U.S.C. 154(b) by 0 days.

(21) Appl. No.: 09/459,809

(22) Filed: Dec. 13, 1999

(51) Int. Cl.$^7$ ................................................. G06T 9/00
(52) U.S. Cl. ........................ 345/555; 345/552; 345/582; 345/536
(58) Field of Search ............................... 345/555, 552, 345/582, 536, 501, 564, 586, 587; 382/232, 233, 244, 245

(56) References Cited

U.S. PATENT DOCUMENTS

| | | | | |
|---|---|---|---|---|
| 5,986,663 A | * | 11/1999 | Wilde ........................... | 345/587 |
| 6,040,837 A | * | 3/2000 | Wong et al. ................. | 345/586 |
| 6,154,216 A | * | 11/2000 | Walton ......................... | 345/555 |
| 6,157,743 A | * | 12/2000 | Goris et al. .................. | 345/552 |
| 6,173,381 B1 | * | 1/2001 | Dye .............................. | 345/555 |
| 6,236,405 B1 | * | 5/2001 | Schilling et al. ............. | 345/582 |
| 6,243,081 B1 | * | 6/2001 | Goris et al. .................. | 345/555 |
| 6,292,191 B1 | * | 9/2001 | Vaswani et al. ............. | 345/582 |
| 6,339,428 B1 | * | 1/2002 | Fowler et al. ............... | 345/582 |
| 6,348,917 B1 | * | 2/2002 | Vaswani ...................... | 345/582 |

* cited by examiner

*Primary Examiner*—Kee M. Tung
(74) *Attorney, Agent, or Firm*—Vedder, Price, Kaufman & Kammholz

(57) ABSTRACT

A method and apparatus for storing data for a plurality of data blocks in a compressed format in memory is presented where the compression scheme used for compressing the data blocks may vary. For each data block included in the plurality of data blocks, the data block is compressed using a compression scheme that is included in a set of predetermined compression schemes. The resulting compressed data set is of a size included in a set of predetermined sizes that correspond to the particular compression scheme utilized. The compressed data set for each block is then stored in a compressed data set memory, where the compressed data sets are stored in groups. A descriptor data set corresponding to each group is then stored in a descriptor memory, where the descriptor data set includes an encoded compression descriptor for each data block included in the group. The data descriptor set also stores a base address that corresponds to a starting location for that group in the compressed data set memory. The encoded compression descriptor for each data block encodes the compression scheme used for that data block and the resulting compressed data set size. When the data for a particular data block is required in an uncompressed format, the storage location of the compressed data set corresponding to that block can be determined from the descriptor data set for the group that includes the particular block required. By combining the base address within the descriptor data set with the sizes of all of the compressed data blocks in the group that precede the particular block in the compressed data set memory, the address for the compressed data set required for decompression can be determined. The compressed data set can then be fetched from memory and decompressed based on the compression scheme as determined from the encoded compression descriptor corresponding to that data block.

30 Claims, 5 Drawing Sheets

METHOD AND APPARATUS FOR STORING COMPRESSED DATA

FIELD OF THE INVENTION

The invention relates generally to storing data in a compressed format and more particularly to a method and apparatus for storing compressed texture data in a video graphics system.

BACKGROUND OF THE INVENTION

Computers are used in many applications. As computing systems continue to evolve, the graphical display requirements of the computing systems become more demanding. This is especially true in applications where detailed three-dimensional graphical displays must be updated quickly. One example of such an application is a computer game where movement and modification of background images may place great demands on the processing power of the computing system.

In order to display some screen images, detailed texture maps are stored in memory. These texture maps are then filtered and adapted to overlay or map to structures, or graphics primitives, for display. An example is a brick pattern that would be mapped onto a wall structure, and if the wall is extending into the distance, the texture will be mapped in such a way as to show perspective.

In order to conserve memory storage resources and available memory bandwidth, it is often desirable to store texture maps in memory in a compressed format. In some prior art systems, texture maps are broken up into blocks and each block is compressed to a predetermined size. This type of fixed length compression allows for simple addressing of the compressed texture data, as the size of each of the compressed blocks is known. However, fixed length compression algorithms limit the level of compression that can be achieved.

In other prior art systems, variable length compression algorithms are used to compress the blocks that make up the texture map. However, because the resulting compressed texture blocks are of variable length, the memory that stores the compressed texture blocks is difficult to address. In other words, it is hard to determine where in memory a particular compressed block is stored due to the fact that the compression lengths for different blocks will vary. Allotting a large amount of space to each compressed texture block in memory may allow for a more fixed addressing scheme, but such implementations make inefficient use of memory resources and are therefore undesirable.

Therefore, a need exists for a method and apparatus for storing compressed data blocks, such as blocks of texture data, where the compression technique is a variable length technique that allows for simple addressing of memory storing the compressed texture blocks.

DETAILED DESCRIPTION OF A PREFERRED EMBODIMENT OF THE INVENTION

Figure 1:
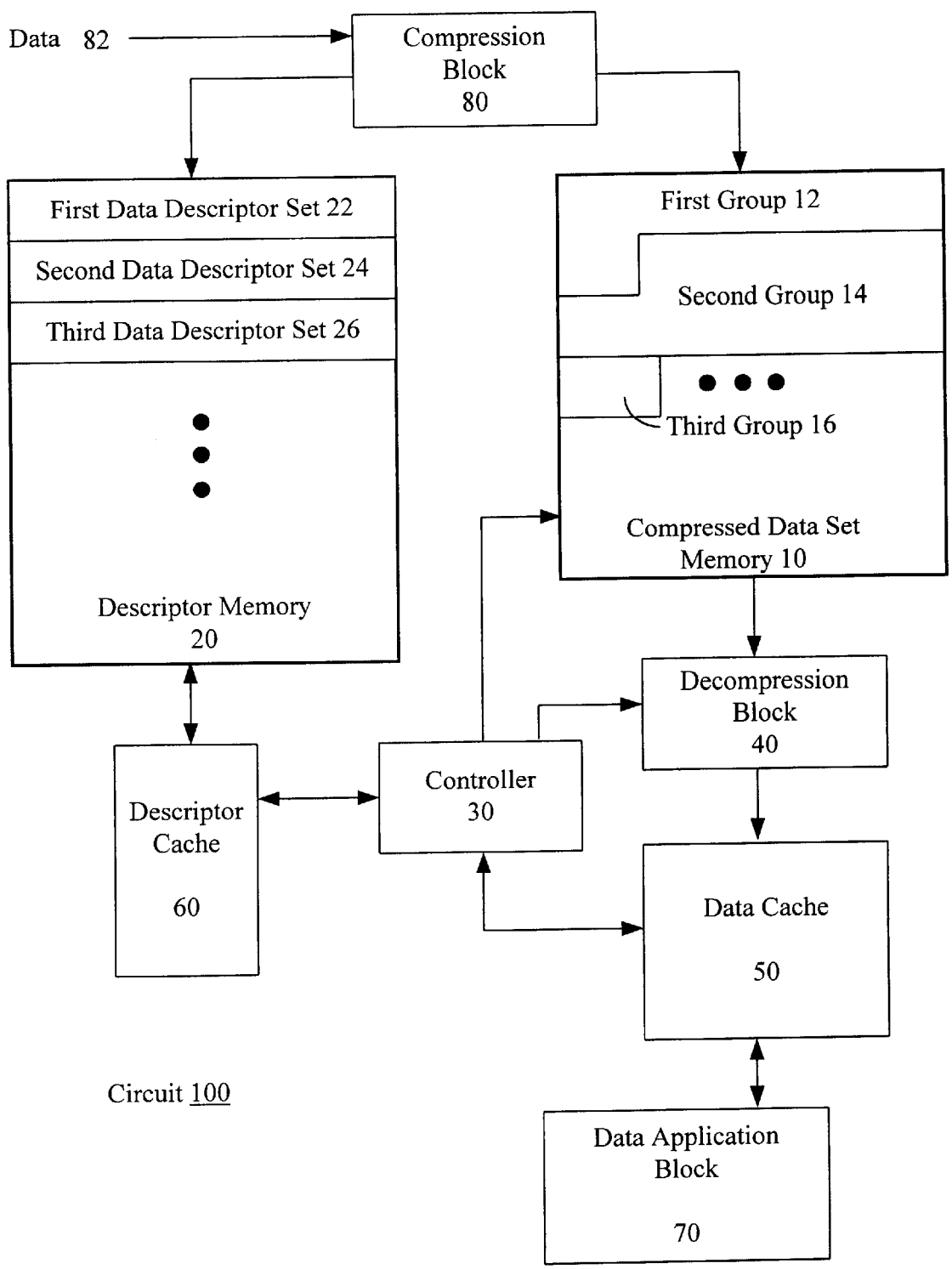
FIG. 1 illustrates a block diagram of a circuit that performs data compression and decompression in accordance with a particular embodiment of the present invention.

Generally, the present invention provides a method and apparatus for storing data for a plurality of data blocks in a compressed format in memory where the compression scheme used for compressing the data blocks may vary. For each data block included in the plurality of data blocks, the data block is compressed using a compression scheme that is included in a set of predetermined compression schemes. The resulting compressed data set is of a size included in a set of predetermined sizes that correspond to the particular compression scheme utilized. The compressed data set for each block is then stored in a compressed data set memory, where the compressed data sets are stored in groups. A descriptor data set corresponding to each group is then stored in a descriptor memory, where the descriptor data set includes an encoded compression descriptor for each data block included in the group. The data descriptor set also stores a base address that corresponds to a starting location for that group in the compressed data set memory. The encoded compression descriptor for each data block encodes the compression scheme used for that data block and the resulting compressed data set size. When the data for a particular data block is required in an uncompressed format, the storage location of the compressed data set corresponding to that block can be determined from the descriptor data set for the group that includes the particular block required. By combining the base address within the descriptor data set with the sizes of all of the compressed data blocks in the group that precede the particular block in the compressed data set memory, the address for the compressed data set required for decompression can be determined. The compressed data set can then be fetched from memory and decompressed based on the compression scheme as determined from the encoded compression descriptor corresponding to that data block.

By compressing data blocks using a variety of compression schemes that can produce various sized compressed data sets, efficient compression of data such as data corresponding to texture maps can be achieved. Addressing of the memory storing the compressed data sets is simplified by storing descriptor data sets that allow the addresses for compressed data sets to be determined regardless of the compression schemes used. As such, memory usage is more efficient, which may decrease system costs and increase system speed.

The discussion provided herein concentrates on the compression of texture maps, but it should be understood that the systems and techniques described are applicable to any type of data which can be broken up into blocks and compressed using various variable- and fixed-length compression schemes. For example, in other video graphics embodiments the compression and decompression teachings provided herein may be applied to storage of Z information (depth coordinate data), color data for images, or other types of data relating to display frame generation.

The invention can be better understood with reference to FIGS. 1–5. FIG. 1 illustrates a block diagram of a circuit 100 that includes a descriptor memory 20, a compressed data set memory 10, a decompression block 40, a controller 30, and a data application block 70. In one embodiment, the circuit 100 is used for storing compressed data blocks corresponding to texture maps used in a video graphics system. Texture maps are made up of a plurality of texels, where each texel indicates a color for the texture at a particular set of texture coordinates. In order to compress a texture map, the texture map is broken up into a number of blocks of texels. In one embodiment, the texture map may be broken up into a plurality of 8×8 texel blocks. As is apparent to one of ordinary skill in the art, the size and shape of the blocks that the texture map is divided into may vary from one application to the next. The size of the texture blocks may be determined based on a trade-off between the efficiency with which the block can be used in an uncompressed format and the level of compression that can be achieved based on the block size.

The circuit 100 may include a compression block 80 that receives the data 82 to be stored in compressed format. In one embodiment, the data 82 is one or more texture maps that are to be stored as a plurality of compressed texture blocks. The compression block 80 divides each texture map received into a plurality of data blocks, or texture blocks, and compresses each of the texture blocks using a compression scheme included in a set of predetermined compression schemes. Each texel block may be an M by N texel block where M and N are numbers. The predetermined set of compression schemes is limited by the encoded compression descriptors stored for each of the compressed data sets, which will be discussed in additional detail below. A variety of compression schemes could be employed for compressing each of the texture blocks, including both variable- and fixed-length compression schemes. Some examples of these potential compression schemes, or algorithms, will be described below.

The compression of each data block using a selected compression scheme produces a compressed data set corresponding to that data block that is of a size that is included in a set of predetermined sizes corresponding to the compression scheme used for compressing the block. Thus, each compression scheme will have a limited number of resulting compressed data set sizes that correspond to that compression scheme. If the compression achieves a size that lies between the compressed data set sizes available, the next-largest size will typically be used such that no data loss occurs. Some compression schemes will have more potential resulting sizes than others. The relationship between the compression scheme and the resulting compressed data set size will be further explained with reference to the descriptor memory 20.

The compressed data set for each of the data blocks is then stored in the compressed data set memory 10. The plurality of data blocks that make up the overall data set 82 is divided into a number of groups. In one embodiment, a group includes 32 data blocks, but as is apparent to one of ordinary skill in the art, the number of data blocks included in a group may vary based on specific implementation. Thus, when the data 82 being compressed is a texture map, each of the texture blocks will belong to a specific group, and all of the groups combined will make up the entire texture map.

The compressed data set memory 10 is shown to be storing a plurality of groups 12–16 where each of the groups includes a plurality of compressed data sets for the data blocks included in that particular group. The ordering of the compressed data sets in each of the groups 12–16 is understood such that location of a particular compressed data set within a group can be ascertained based on the other compressed data sets included in a particular group. As is illustrated, the amount of memory required for storage of a set of compressed data sets that make up a particular group can vary. Thus, the second group 14 is shown to require more storage space in the compressed data set memory 10 than the first group 12. The third group 16 is shown to require the least amount of space amongst the three groups 12–16 illustrated. Note that the three groups 12–16 are shown merely for illustrative purposes, and it should be understood that the compressed data set memory 10 preferably stores all of the compressed data sets required for the data being compressed.

As the compression block 80 stores a compressed data set in the compressed data set memory 10, it also stores an encoded compression descriptor for the data block in a descriptor data set corresponding to the group within which the data block is included. These data descriptor sets are preferably stored in a descriptor memory 20 that may be a separate memory structure from the compressed data set memory 10. In other embodiments, the two types of data may be stored in a common memory structure. Each of the data descriptor sets 22–26 shown to be stored in the descriptor memory 20 corresponds to one of the groups 12–16 stored in the compressed data set memory 10. Thus, the first data descriptor set 22 corresponds to the first group 12. Similarly, the second data descriptor set 24 corresponds to the second group 14, and the third data descriptor set 26 corresponds to the third group 16. Each group of compressed data sets stored in the compressed data set memory 10 will have a corresponding data descriptor set in the descriptor memory 20.

Figure 2:
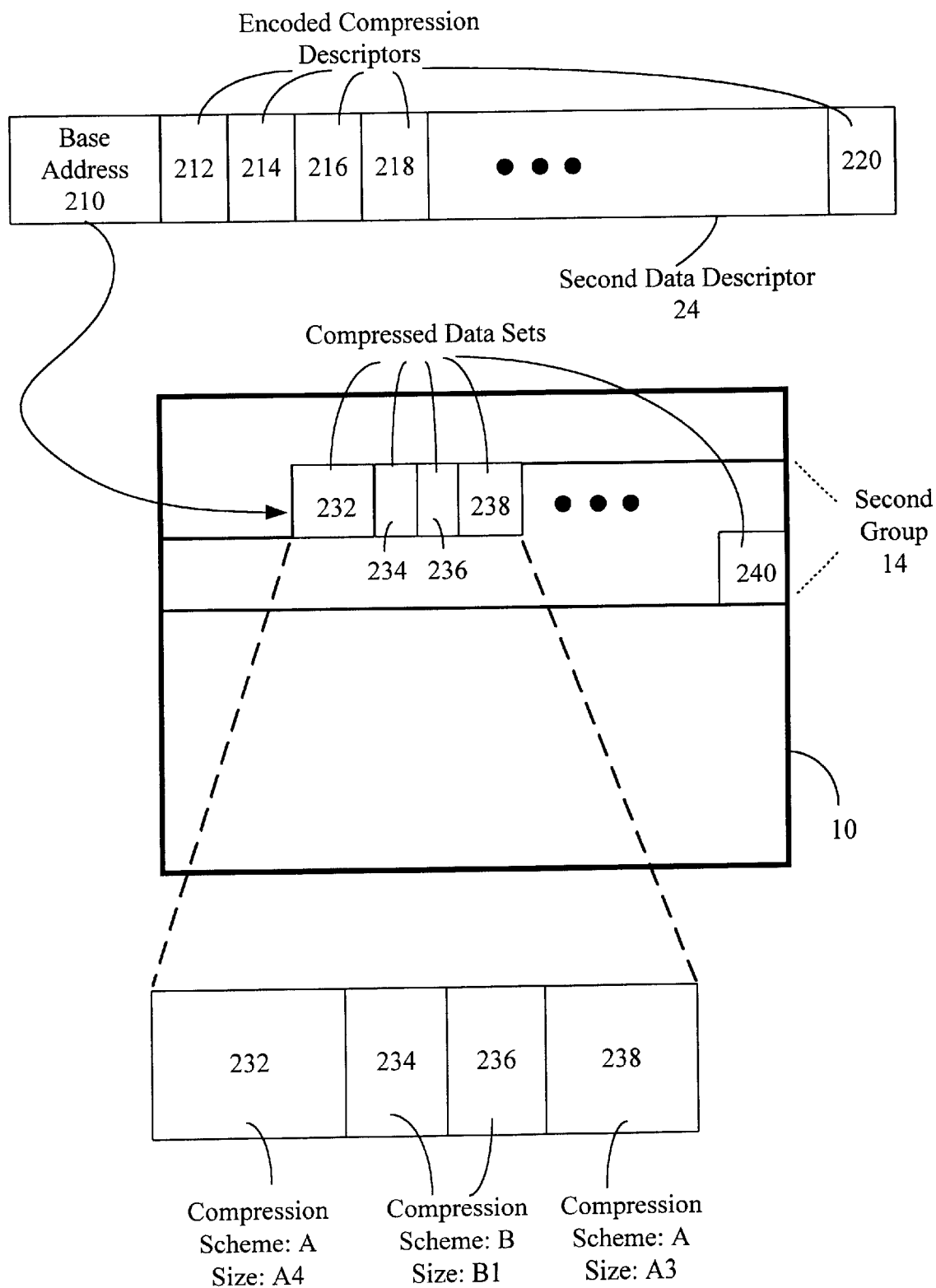
FIG. 2 illustrates a graphical representation of portions of the compression and decompression scheme utilized in the circuit of FIG. 1.

By referring to FIG. 2, the relationship between a particular data descriptor set and a group of compressed data sets can be better understood. FIG. 2 illustrates the second data descriptor set 24 which includes a base address 210 and a plurality of encoded compression descriptors 212–220. As indicated earlier, the second data descriptor set 24 corresponds to the second group 14 of compressed data sets stored in the compressed data set memory 10. The second group 14 of compressed data sets is shown to include a plurality of data sets 232–240. Each of the encoded compression descriptors 212–220 included in the second data descriptor set 24 corresponds to one of the compressed data sets 232–240 included in the second group 14. Thus, the encoded compression descriptor 212 corresponds to the compressed data set 232, the encoded compression descriptor 214 corresponds to the compressed data set 234, and so on until the last encoded compression descriptor 220 which corresponds to the last compressed data set 240 included in the second group 14.

Each of the encoded compression descriptors encodes the compression scheme and resulting size for the compressed data set to which the encoded compression descriptor corresponds. Thus, the encoded compression descriptor 212 encodes the compression scheme used for compressing the compressed data set 232, and also encodes the resulting size of the compressed data set 232 as it is stored in the compressed data set memory 10. Preferably, each of the encoded compression descriptors includes K bits such that $2^K$ different compression scheme/size combinations can be encoded by encoded compression descriptor. In one embodiment, each encoded compression descriptor may include seven bits such that $2^7$ (128) different compression scheme/size combinations may be encoded. As is apparent to one of ordinary skill in the art, the number of bits allocated to each encoded compression descriptor may vary based on the particular system.

The base address 210 included in the second data descriptor set 24 indicates the starting address for the second group 14 in the compressed data set memory 10. The first compressed data set 232 preferably begins at the address corresponding to the base address 210. Thus, if the first compressed data set 232 needs to be fetched for decompression, the base address 210 can be utilized to find the location of the first compressed data set 232.

However, if the fourth compressed data set 238 is required for processing operations, the base address 210 is insufficient for determining the location of the fourth compressed data set 238 in the compressed data set memory 10. Because each of the compressed data sets included in the second group 14 may be of a variable length, the size of the compressed data sets which precede the fourth compressed data set 238 in the second group 14 must be determined in order to calculate the starting address of the fourth compressed data set 238 in the compressed data set memory 10. Therefore, in order to determine the starting address of the compressed data set 238, the encoded compression descriptors 212–216 can be utilized to determine the size of the compressed data sets 232–236. The size of these compressed data sets can then be added to the base address 210 to determine the starting address for the fourth compressed data set 238.

As is illustrated at the bottom of FIG. 2, the first compressed data set may be compressed using compression scheme A and have a resulting size of A4, where A4 represents one of the potential sizes corresponding to compression scheme A. Each of the compressed data sets 234 and 236 are compressed using compression scheme B and have a resulting size B1. Thus, in order to determine the starting address of the fourth compressed data set 238, the value of the base address 210 can be added to the sizes (A4+B1+B1). The compressed data set 238 can then be fetched from the compressed data set memory 10 for decompression and use. Preferably, the encoded compression descriptor 218 is used to determine the size of the compressed data set 238 such that the fetching operation of the compressed data set 238 for decompression is performed in an efficient manner. In other words, by knowing that the compressed data blocks 238 has been compressed to a size A3, the fetching operations performed with regard to the compressed data set memory 10 will fetch just enough data to ensure that all of the compressed data set 238 has been fetched for decompression.

Returning to FIG. 1, the controller 30 preferably controls operations associated with decompression of compressed data sets stored in the compressed data set memory 10. The controller is operably coupled to the descriptor memory 20, the compressed data set memory 10, and the decompression block 40. The controller 30 receives an address corresponding to a data block of the plurality of data blocks that have compressed data sets stored in the compressed data set memory 10. In one embodiment, the circuit 100 includes a data cache 50 such that once a compressed data set has been decompressed by the decompression block 40, the uncompressed data is stored in the data cache 50 for use. Because the data application block 70, which may be a texture application block, may often require multiple data points within a data block for processing operations, the inclusion of the data cache 50 in the system enables the data for a block that has been decompressed to be used repeatedly in an efficient manner until it is eventually replaced in a new set of uncompressed data. The use of cache structures for storing data in such a manner is well known in the art.

Assuming that the data application block 70 provides an address (which may correspond to texture map coordinates) corresponding to a data block to the data cache 50 and it is determined that the data for that data block is not currently stored in the data cache 50, the controller 30 receives the address corresponding to the data block. Based on the received address, the controller 30 can fetch the data descriptor set corresponding to the group that includes the block for which the uncompressed data is required. In order to facilitate the fetching of data descriptor sets from the descriptor memory 20, a descriptor cache 60 may be included in the system. The descriptor cache 60 is operably coupled to the descriptor memory 20 and the controller 30. The descriptor cache 60 caches, or temporarily stores, a portion of the data descriptor sets included in the descriptor memory 20 for fast and convenient use by the controller 30.

The controller 30 calculates the starting address of the compressed data set for the required data block in the compressed data set memory 10 using the data descriptor set fetched. As described earlier, this may be accomplished by adding the base address value included in the data descriptor set to the size values for any compressed data blocks that precede the particular compressed data set desired in the group within which they are all included. In order to facilitate rapid calculation of the address of the compressed data set, an adder tree that includes a plurality of parallel adding blocks that are configurable may be included within the controller 30. The adder tree would include a plurality of decoding blocks that are able to determine the size for each of the compressed data sets that precede the particular compressed data set in the group. The values of these sizes can then be added, possibly in a parallel manner, and combined with the base address value to quickly determine the address of the particular compressed data set in the compressed data set memory 10. As is apparent to one of ordinary skill in the art, various circuits can be designed to provide an efficient means of calculating the address by combining the base address and the size values for the preceding compressed data sets.

Once the controller 30 has determined the address of the compressed data set for the data block that the data application block 70 requires, it fetches the compressed data set from the data set memory 10 such that the compressed data set is provided to the decompression block 40. Preferably, the controller 30 fetches the compressed data set based on the size value of the compressed data set as determined from the encoded compression descriptor corresponding to the compressed data set.

The controller 30 also determines the compression scheme used for compressing the data included in the compressed data set and provides an indication as to the compression scheme to the decompression block 40. The decompression block 40 then decompresses the compressed data set to produce data values for the data block that may then be stored in the data cache 50 for use by the data application block 70. As stated earlier, the data application block 70 may be a texturing block that receives pixels or pixel fragments and performs texture mapping operations on pixels or pixel fragments received based on texture map data in an uncompressed format as provided by the decompression block 40.

Depending on the number of bits used to encode each encoded compression descriptor in the data descriptor sets, a variety of compression schemes and resulting compressed data set sizes can be supported in a particular system. For example, the compression of texture maps may include compression algorithms such as those that compress texture blocks to a resulting fixed size. One example might include compression of a texture block that is completely black, where the storage space required for storage of the resulting compressed texture map is zero bits as the encoded compression descriptor for the block may simply indicate that the entire block is black. Similarly, a compression scheme that indicates no compression has taken place will also produce a fixed- size compressed data set, as the data for the data block will be stored in an uncompressed format in the compressed data set memory 10. Because the number of texels in each data block is known, the size of such an uncompressed data block is apparent.

Other compression schemes may involve choosing a number of colors where a first portion of the compressed texture block indicates the colors and subsequent values within the compressed data block indicate which color corresponds to a particular texel at each coordinate. For example, eight 32-bit colors may be selected, and, if the texture block is an 8×8 block, 64 three-bit values could select one of the eight colors for each texel location. Thus, the resulting fixed size would be equal to the number of bits required to store the eight 32-bit colors (256 bits) plus the number of bits required to encode the appropriate color for each texel location (192 bits).

Different variable-length compression schemes may be utilized for compressing the data blocks, and many such variable-length schemes are well known in the art. One example is run length encoding, where a certain number of bits encodes a number of texels for which a proceeding or subsequent color value applies. For example, a first size value, which may include four bits, would encode a number of texels up to $2^4$(16) texels to which the following color, which is encoded as 32 bits, applies. Thus if the first four texels of a texel block were green, the first four bits would encode the value four and the following 32 bits would encode the color green.

Figure 3:
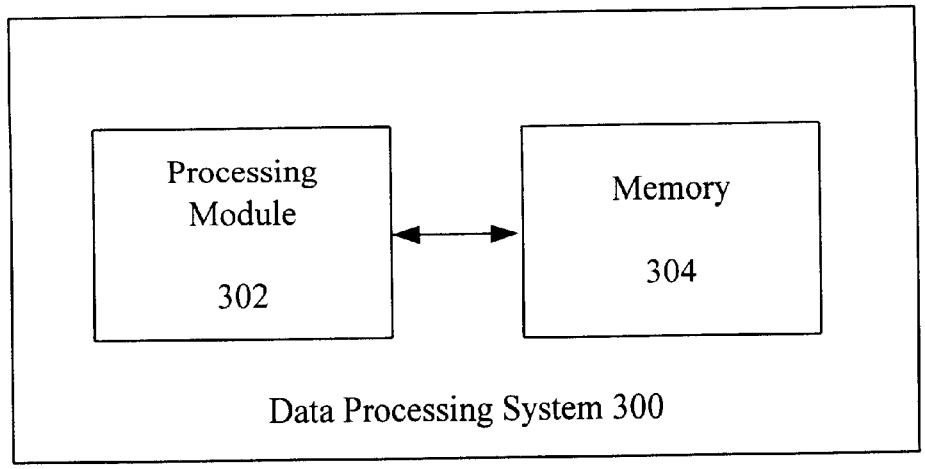
FIG. 3 illustrates a block diagram of a data processing system in accordance with a particular embodiment of the present invention.

FIG. 3 illustrates a block diagram of a data processing system 300 that includes a processing module 302 and memory 304. The processing module 302 may include a single processing entity or a plurality of processing entities. Such a processing entity may be a microprocessor, a microcontroller, a digital signal processor, a state machine, logic circuitry, or any device that processes information based on operational or programming instructions.

The memory 304 may be a single memory device or a plurality of memory devices. Such a memory device may be a read only memory device, random access memory device, floppy disk, hard drive memory, or any device that stores digital information. Note that when the processing module 302 has one or more of its functions performed by a state machine or logic circuitry, the memory containing the corresponding operational instructions is embedded within the state machine or logic circuitry.

Figure 4:
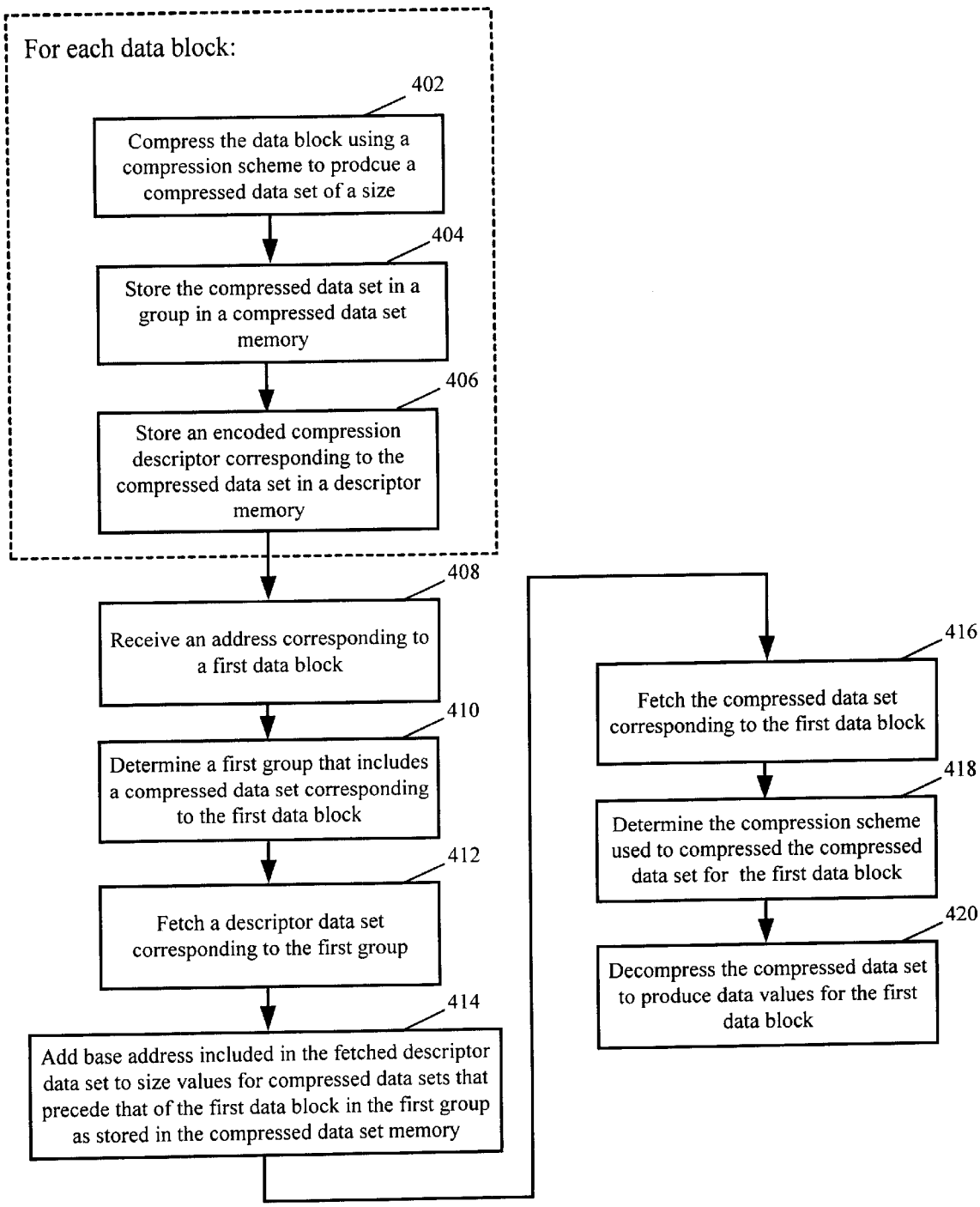
FIG. 4 illustrates a flow diagram of a method for compressing data in accordance with a particular embodiment of the present invention.

The memory 304 stores programming or operational instructions that, when executed by the processing module 302, allow the processing module 302 to perform functions such as those illustrated in the method of FIG. 4. Note that the data processing system 300 may implement some of the functions of FIG. 4 through software stored in the memory 304, whereas other portions may be implemented using hardware or circuitry within the data processing system 300. Thus, in some embodiments a mix of hardware and software may be used to perform the method illustrated in FIG. 4.

FIG. 4 illustrates a flow diagram of a method for compressing data corresponding to a plurality of data blocks where each of the plurality of data blocks includes a plurality of data values. In one embodiment, the plurality of data blocks corresponds to a texture map that has been divided into the plurality of blocks where each block includes a number of texels. In such an embodiment, the data blocks may correspond to M×N texel blocks, and in one example embodiment the texel blocks are 8×8 texel blocks.

The method begins at steps 402–406 where, for each data block of the plurality of data blocks, steps 402–406 are performed. At step 402 the data block is compressed using a compression scheme included in a set of predetermined compression schemes. The compression performed at step 402 produces a compressed data set of a size included in a predetermined set of sizes corresponding to the particular compression scheme used. As described with respect to FIGS. 1 and 2, the compression schemes used to perform the compression at step 402 may include both fixed- and variable-length compression schemes. Thus, at least a portion of the data blocks that are compressed may be compressed using a variable-length compression scheme.

At step 404, the compressed data set resulting from the compression at step 402 is stored in a compressed data set memory. Storage of the compressed data set in the compressed data set memory is performed in a manner such that compressed data sets are grouped into a plurality of groups where each group includes a predetermined number of compressed data sets. The compressed data sets in each group are stored in a known order such that the location of different compressed data sets within each group can be determined based on its relative position with respect to other compressed data sets within the group.

At step 406, an encoded compression descriptor is stored for the data block in a descriptor data set corresponding to the selected group that includes the compressed data set as stored at step 404. Thus, each group has a corresponding descriptor data set that is preferably stored in a descriptor memory. The descriptor memory may be included in a separate memory structure from the compressed data set memory, or both memory may be included within a shared memory structure.

Each descriptor data set includes a base address value and a plurality of ordered encoded compression descriptors corresponding to compressed data sets included in the group to which the descriptor data set corresponds. Ordering of the plurality of ordered encoded compression descriptors is based on storage order of the compressed data sets of the selected group in the compressed data set memory. Each encoded compression descriptor indicates which compression scheme was used to perform the compression of a data set and also what the resulting size of the compressed data set is.

After the compression steps have been performed for at least a portion of the data blocks, the compressed information may be used in data processing operations. In order to use the compressed information, decompression of the compressed data set required for processing is performed. At step 408, an address is received for a first data block of the plurality of data blocks. At step 410, the address is used to determine the group (referred to as the first group) stored in the compressed data set memory within which the compressed data set for the first data block is included. In an embodiment where the data blocks correspond to portions of a texture map, the address for the first data block may include texture coordinates, where the texture coordinates are used to determine the particular texture map location for which uncompressed data is required.

At step 412, the descriptor data set corresponding to the first group is fetched from the descriptor memory. Fetching the descriptor data set at step 412 may include storing the descriptor data set in a descriptor cache such that repeated use of the descriptor data set can be performed in an efficient manner. The base address value included in the descriptor data set is then added to the size values for data blocks that precede the first data block in the first group as stored in the compressed data set memory to determine an address for the compressed data set corresponding to the first data block in the compressed data set memory. The size values for the data blocks that precede the first data block in the first group are determined by decoding the encoded compression descriptors corresponding to the data blocks that precede the first data block in the descriptor data set. As described earlier with respect to FIG. 2, this may be accomplished in a variety of ways apparent to one of ordinary skill in the art. In one embodiment, a configurable adder tree may be utilized. Each encoded compression descriptor may include K bits such that the K bits encode $2^K$ potential compression scheme/size combinations. This was described with respect to FIGS. 1 and 2 above.

At step 416, the compressed data set corresponding to the first data block is fetched from the compressed data set memory using the address determined at step 414. The fetching performed at step 416 may be performed based on the size value of the compressed data set for the first data block as determined from the encoded compression descriptor for the compressed data set as included in the descriptor data set fetched at step 412. By using the size of the compressed data set to perform the fetching at step 416, the memory accesses required to do the fetching can be specifically configured to maximize efficiency of memory usage.

At step 418, the compression scheme used to compress the compressed data set for the first data block is determined from the encoded compression descriptor for the first data block. The encoded compression descriptor for the first data block is included in the descriptor data set fetched at step 412. Based on this, the compressed data set is decompressed at step 420 to produce data values for the first data block. These data values may then be stored in a data cache for use in data processing operations such as texturing operations.

Figure 5:
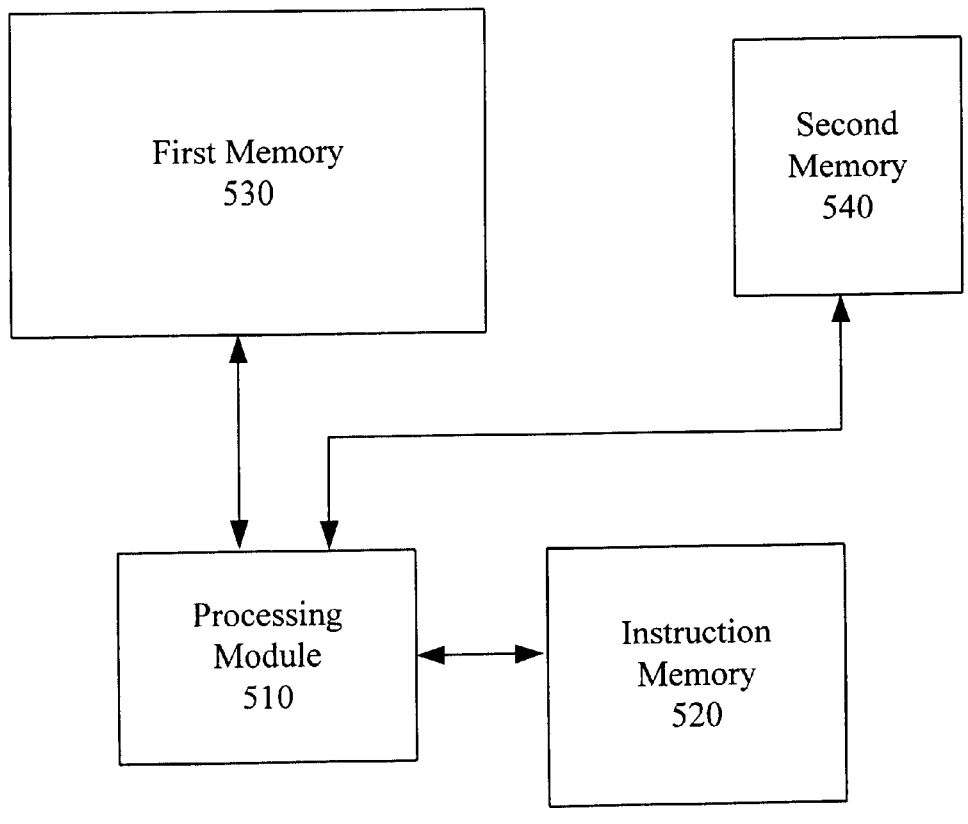
FIG. 5 illustrates a block diagram of an alternate data processing system in accordance with a particular embodiment of the present invention.

FIG. 5 illustrates another embodiment of a data processing system that stores data corresponding to data blocks in a compressed format and decompresses them for use. The data processing system 500 is shown to include a processing module 510, an instruction memory 520, a first memory 530, and a second memory 540. The processing module 510 is operably coupled to each of the memory structures in the data processing system 500. In one embodiment, all of the memory structures 520–540 may be included in a single memory circuit, where as in other embodiments the various memory structures may be implemented in separate memory structures or grouped in various arrangements. The processing module 510 may be a processing module of a configuration as was described with respect to the processing module 302 of FIG. 3. The instruction memory 520 is similar to the memory 304 of FIG. 3 in that the instruction memory 520 stores operating instructions that, when executed by the processing module 510, cause the processing module 510 to perform a set of functions. The functions performed by the processing module 510 include those for compressing and decompressing data corresponding to a plurality of data blocks. As described earlier, such data blocks may include texture data blocks that make up a texture map for use in a video graphics processing system.

Figure 6:
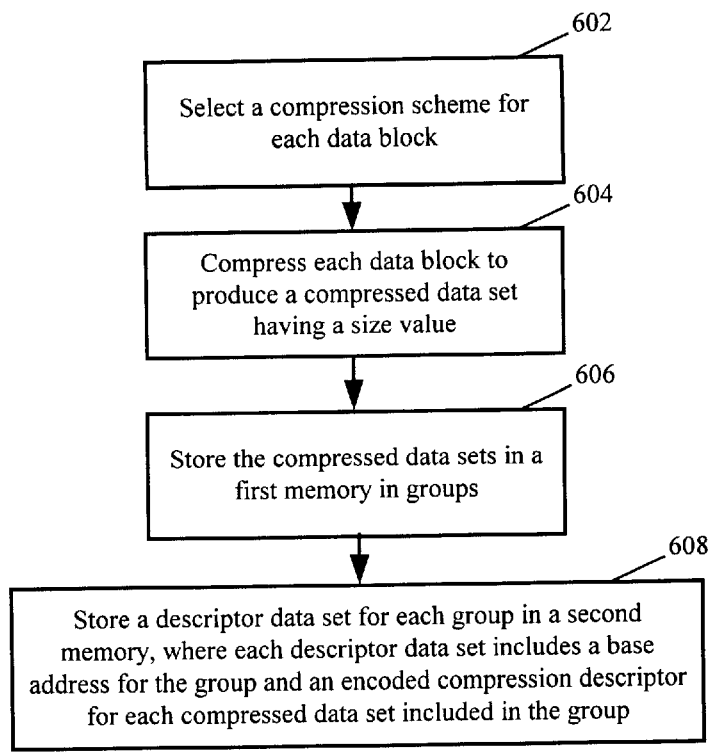
FIG. 6 illustrates a flow diagram of a method for storing compressed data in accordance with a particular embodiment of the present invention.
Figure 7:
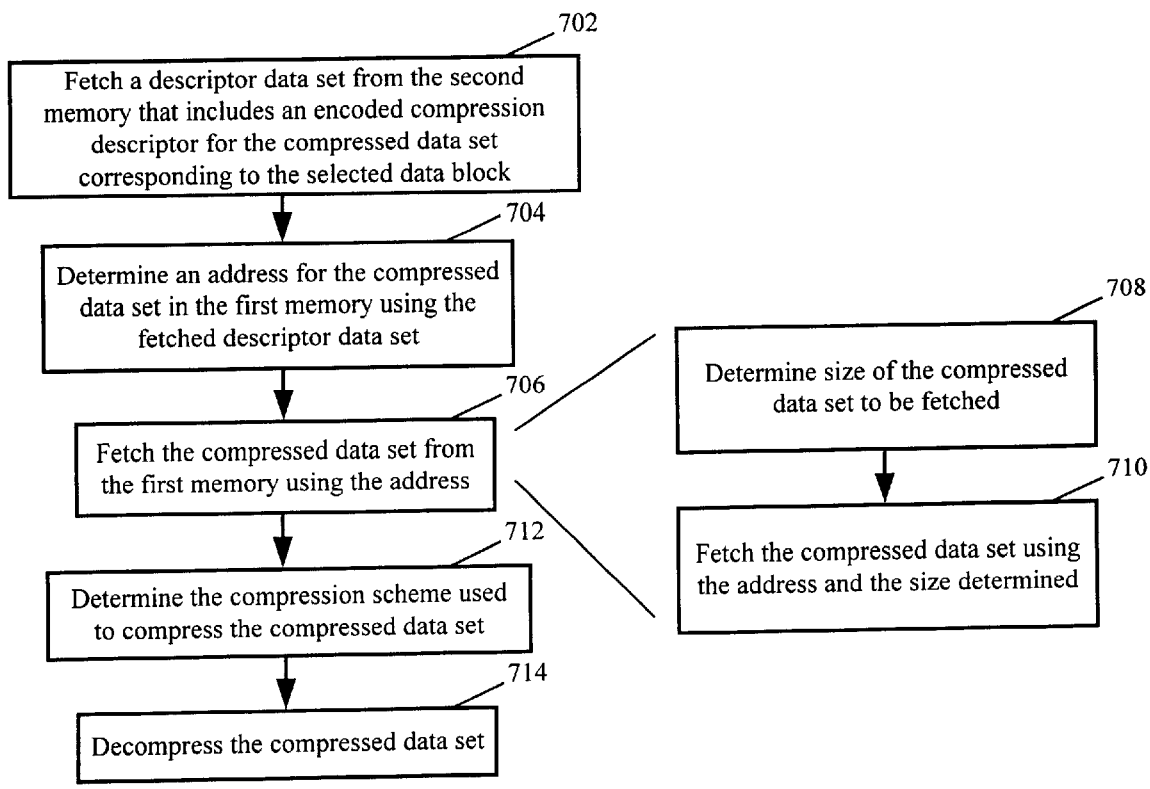
FIG. 7 illustrates a flow diagram of a method for decompressing data stored in a compressed format in accordance with a particular embodiment of the present invention.

Functions that may be performed by the processing module 510 are illustrated in the flow diagrams of FIGS. 6 and 7. FIG. 6 illustrates a method for compressing the data for the plurality of data blocks for storage in the data processing system 500. At step 602, a compression scheme is selected for each data block of the plurality of data blocks to be compressed. The compression scheme may differ from one data block to the next, and the compression scheme selected for each block is taken from a set of predetermined compression schemes. Preferably, the compression schemes include both fixed- and variable-length compression schemes.

At step 604, each data block is compressed using the selected compression scheme for the data block to produce a compressed data set. The compressing performed at steps 604 compresses the data within each data block to a compressed size. As described earlier, each compression schemes supports one or more different sizes such that data blocks compressed using a compression scheme can be compressed to one of the sizes supported by that particular compression scheme.

At step 606, the compressed data blocks corresponding to each of the plurality of data blocks are stored in the first memory 530. The compressed data blocks are grouped into a plurality of groups within the first memory 530, where compressed data blocks in each of the plurality of groups are stored in a predetermined order within the first memory 530. The first memory 530 is similar to the compressed data set memory of FIG. 1.

At step 608, a descriptor data set is stored for each group in the second memory 540. Each descriptor data set includes an encoded compression descriptor for each compressed data block included in the group. Each encoded compression descriptor encodes the compression scheme and compressed size for each compressed data block. Ordering of the encoded compression descriptors in the descriptor data set corresponds to ordering of the compressed data sets for the group as stored in the first memory 530.

FIG. 7 illustrates the functions that may be performed by the processing module 510 in order to decompress the compressed data sets for use. The method illustrates the decompression of compressed data for a selected data block of the plurality of data blocks that have been compressed. The method begins at step 702 where a descriptor data set is fetched from the second memory 540 where the descriptor data set fetched includes an encoded compression descriptor for the compressed data block that corresponds to the selected block to be decompressed.

At step 704, an address of the compressed data block corresponding to the selected data block is determined based on the base address of the descriptor data set fetched from the second memory and the size values of the compressed data blocks that precede the compressed data set corresponding to the selected data block within the particular group as stored in the first memory 530. As described earlier, the address determination performed at step 704 may utilize an adder tree such that multiple encoded compression descriptors can be decoded to determine the size values that may then be added in parallel with the base address value.

At step 706, the compressed data block corresponding to the selected data block is fetched from the first memory using the address determined at step 704. Preferably, step 706 includes steps 708 and 710. At step 708, the compressed size of the compressed data block corresponding to the selected data block is determined based on the encoded compression descriptor for the selected data block. At step 710, the fetching of the compressed data set from the first memory is performed using the compressed size as determined at step 708.

At step 712, the compression scheme used to compress the compressed data set corresponding to the selected data block is determined from the encoded compression descriptor for the selected data block. At step 714, the compressed data set is decompressed based on the compression scheme determined at step 712 to produce data of the selected data block. This data, which is an uncompressed format, can then be used for various processing operations, such as those associated with texturing operations.

By providing a system that supports fixed- and variable length compression of data blocks, memory can be used efficiently in systems that are required to use the data included in the data blocks. Depending on the number of bits included in the encoded compression descriptors, a number of compression schemes and compressed data set sizes can be supported. The descriptor data sets corresponding to the groups of compressed data sets in memory enable the compressed data to be retrieved and utilized in a manner that avoids delays often associated with locating a particular compressed data set in memory when variable length compression schemes are supported.

It should be understood that the implementation of other variations and modifications of the invention in its various aspects will be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for compressing data corresponding to a plurality of data blocks, wherein each of the plurality of data blocks includes a plurality of data values, comprising:

for each data block of the plurality of data blocks:
compressing the data block using a compression scheme included in a set of predetermined compression schemes to produce a compressed data set of a size included in a set of predetermined sizes corresponding to the compression scheme;
storing the compressed data set in a compressed data set memory, wherein the compressed data set is included in a selected group of compressed data sets in the compressed data set memory, wherein a plurality of groups of compressed data sets are stored in the compressed data set memory; and
storing an encoded compression descriptor for the data block in a descriptor data set corresponding to the selected group, wherein the descriptor data set includes a base address value and a plurality of ordered encoded compression descriptors corresponding to compressed data sets included in the selected group, wherein ordering of the plurality of ordered encoded compression descriptors is based on storage order of the compressed data sets of the selected group in the compressed data set memory, wherein the descriptor data set is stored in a descriptor memory, wherein the encoded compression descriptor encodes the compression scheme and the size corresponding to the compressed data set;

receiving an address corresponding to a first data block of the plurality of data blocks;

determining a first group that includes a compressed data set corresponding to the first data block;

fetching a descriptor data set corresponding to the first group from the descriptor memory;

adding the base address value of the descriptor data set corresponding to the first group to size values for data blocks that precede the first data block in the first group as stored in the compressed data set memory to determine an address for the compressed data set corresponding to the first data block in the compressed data set memory, wherein the size values for data blocks that precede the first data block are determined by decoding the encoded compression descriptors corresponding to the data blocks that precede the first data block in the first group;

fetching the compressed data set corresponding to the first data block from the compressed data set memory using the address for the compressed data set corresponding to the first data block in the compressed data set memory;

determining the compression scheme corresponding to the compressed data set for the first data block from the encoded compression descriptor for the first data block; and decompressing the compressed data set for the first data block to produce data values for the first data block, wherein the decompressing is performed based on the compression scheme corresponding to the compressed data set for the first data block.

2. The method of claim 1, wherein data values for each of the plurality of data blocks are texture map data values.

3. The method of claim 2, wherein each of the data blocks corresponds to a M-by-N texel block.

4. The method of claim 3 further comprises texturing pixels using the texture map data values for the first data block.

5. The method of claim 1, wherein the compressed data set memory and the descriptor memory are included in a common memory structure.

6. The method of claim 1 further comprises storing the data values for the first data block in a data cache for use in data processing operations.

7. The method of claim 1, wherein fetching the descriptor data set further comprises storing the descriptor data set in a descriptor cache.

8. The method of claim 1, wherein each encoded compression descriptor includes K bits, wherein the K bits encode $2^K$ potential compression scheme/size combinations.

9. The method of claim 1, wherein compressing each data block of the plurality of data blocks further comprises compressing at least a portion of the data blocks in the plurality of data blocks using a variable length compression scheme.

10. A method for storing compressed data for a plurality of data blocks, comprising:

selecting a compression scheme for each data block of the plurality of data blocks, wherein each compression scheme selected is selected from a set of predetermined compression schemes;

compressing each data block using the compression scheme selected for the data block to produce a compressed data set corresponding to each data block, wherein compressing compresses data within each data block to a size corresponding to the compression scheme selected for the data block, wherein each compression scheme supports at least one size;

storing the compressed data sets corresponding to the plurality of data blocks in a first memory, wherein the compressed data sets are grouped into a plurality of groups, wherein compressed data sets in each of the plurality of groups are stored in a predetermined order within the first memory; and storing a descriptor data set for each group of the plurality of groups in a second memory, wherein each descriptor data set includes a base address for the group in the first memory and an encoded compression descriptor for each compressed data set included in the group, wherein each encoded compression descriptor encodes the compression scheme and the size for each compressed data set, wherein ordering of encoded compression descriptors in the descriptor data set corresponds to ordering of the compressed data sets for the group as stored in the first memory.

11. The method of claim 10 further comprises decompressing a compressed data set for a selected data block of the plurality of data blocks, wherein decompressing includes:

fetching a descriptor data set from the second memory that includes an encoded compression descriptor for the compressed data set that corresponds to the selected data block;

determining an address of the compressed data set corresponding to the selected data set in the first memory based on the base address of the descriptor data set fetched from the second memory and sizes of other compressed data blocks as indicated by additional encoded compression descriptors included in the descriptor data set fetched;

fetching the compressed data block corresponding to the selected data set from the first memory using the address;

determining the compression scheme used for compressing the compressed data set corresponding to the selected data block based on the encoded compression descriptor corresponding to the compressed data set in the descriptor data set fetched from the second memory; and decompressing the compressed data set fetched from the first memory based on the compression scheme used for compressing the compressed data set to produce data of the selected data block.

12. The method of claim 11, wherein fetching the compressed data block corresponding to the selected data set further comprises:

determining the size of the compressed data block based on the encoded compression descriptor corresponding to the compressed data set in the descriptor data set fetched from the second memory; and fetching the compressed data set from the first memory using the address and the size of the compressed data block.

13. A data compression circuit that stores compressed data for a plurality of data blocks, comprising:

a compressed data set memory that stores a plurality of compressed data sets, wherein each of the plurality of compressed data sets corresponds to one of the plurality of data blocks, wherein at least a portion of the plurality of compressed data sets are compressed using a variable length compression scheme, wherein the compressed data sets are stored in the compressed data set memory in a predetermined order;

a descriptor memory that stores a plurality of data descriptor sets, wherein each data descriptor set of the plurality of data descriptor sets includes a base address pointer and a plurality of encoded compression descriptors for a group of data blocks, wherein the encoded compression descriptors in each data descriptor set are ordered based on the predetermined order of the compressed data sets for a corresponding group as stored in the compressed data set memory, wherein each base address pointer indicates a starting address for compressed data blocks included in a corresponding group as stored in the compressed data set memory, wherein each encoded compression descriptor in a data descriptor set indicates a compression scheme and size value for a data block included in the group of data blocks to which the data descriptor set corresponds;

a decompression block operably coupled to the compressed data set memory, wherein the decompression block receives a selected compressed data set and an indication as to a compression scheme used for compressing the selected compressed data set, wherein the decompression block decompresses the selected compressed data set received based on the compression scheme as indicated to produce uncompressed data block data; and a controller operably coupled to the decompression block, the descriptor memory, and the compressed data set memory, wherein the controller receives coordinates corresponding to a selected data block, wherein the controller retrieves a selected descriptor data set corresponding to the selected data block from the descriptor memory, wherein the controller determines an address for a selected compressed data set in the compressed data set memory based on the selected descriptor data set, wherein the controller issues control signals to the compressed data set memory based on the address such that the compressed data set memory provides the selected compressed data set to the decompression block, wherein the selected compressed data set corresponds to the selected data block, wherein the controller determines a compression scheme used for compressing the selected compressed data set based on a encoded compression descriptor included in the descriptor data set retrieved, wherein the controller provides the indication as to the compression scheme to the decompression block.

14. The data compression circuit of claim 13, wherein the plurality of data blocks correspond to a texture map such that each of the plurality of data block includes a portion of the texture map.

15. The data compression circuit of claim 14, wherein the compressed data set memory stores compressed texel colors for each portion of the texture map.

16. The data compression circuit of claim 15 further comprises a texture mapping block operably coupled to the controller and the decompression block, wherein the texture mapping block provides coordinates corresponding to a portion of the texture map to the control block and utilizes resulting uncompressed data block data from the decompression block to perform texturing operations related to video graphics data.

17. The data compression circuit of claim 13 further comprises a descriptor cache operably coupled to the descriptor memory and the controller, wherein the descriptor cache stores at least a portion of the plurality of data descriptor sets stored in the descriptor memory.

18. The data compression circuit of claim 13 further comprises a data cache operably coupled to the decompression block and the controller, wherein data cache caches uncompressed data block data.

19. The data compression circuit of claim 13 further comprises a compression block operably coupled to the compressed data set memory and the descriptor memory, wherein the compression block receives uncompressed data corresponding to the plurality of data blocks and compresses each of the plurality of data blocks to produce the plurality of compressed data sets stored in the compressed data set memory, wherein the compression block generates the plurality of data descriptor sets that are stored in the descriptor memory based on compression performed on the plurality of data blocks.

20. The data compression circuit of claim 13, wherein each of the encoded compression descriptors include K bits, wherein each encoded compression descriptor encodes one of $2^K$ potential compression scheme/size combinations.

21. The data compression circuit of claim 13, wherein the controller determines the address for a compressed data set by adding the base address pointer for the selected descriptor data set to size values corresponding to data blocks that precede the selected data block in the selected descriptor data set.

22. The data compression circuit of claim 21, wherein the controller adds the base address pointer to the size values using a configurable adder tree that includes a plurality of decoding blocks that decode the size values from encoded compression descriptors included in the selected descriptor data set.

23. A data processing system, comprising:
a processing module; and
memory operably coupled to the processing module, wherein the memory stores operating instructions that, when executed by the processing module, cause the processing module to perform functions that include:
for each data block of a plurality of data blocks, wherein each of the plurality of data blocks includes a plurality of data values:
compressing the data block using a compression scheme included in a set of predetermined compression schemes to produce a compressed data set of a size included in a set of predetermined sizes corresponding to the compression scheme;
storing the compressed data set in a compressed data set memory, wherein the compressed data set is included in a selected group of compressed data sets in the compressed data set memory, wherein a plurality of groups of compressed data sets are stored in the compressed data set memory; and
storing an encoded compression descriptor for the data block in a descriptor data set corresponding to the selected group, wherein the descriptor data set includes a base address value and a plurality of ordered encoded compression descriptors corresponding to compressed data sets included in the selected group, wherein ordering of the plurality of ordered encoded compression descriptors is based on storage order of the compressed data sets of the selected group in the compressed data set memory,wherein the descriptor data set is stored in a descriptor memory, wherein the encoded compression descriptor encodes the compression scheme and the size corresponding to the compressed data set;
receiving an address corresponding to a first data block of the plurality of data blocks;
determining a first group that includes a compressed data set corresponding to the first data block;
fetching a descriptor data set corresponding to the first group from the descriptor memory;
adding the base address value of the descriptor data set corresponding to the first group to size values for data blocks that precede the first data block in the first group as stored in the compressed data set memory to determine an address for the compressed data set corresponding to the first data block in the compressed data set memory, wherein the size values for data blocks that precede the first data block are determined by decoding the encoded compression descriptors corresponding to the data blocks that precede the first data block in the descriptor data set corresponding to the first group;
fetching the compressed data set corresponding to the first data block from the compressed data set memory using the address for the compressed data set corresponding to the first data block in the compressed data set memory;
determining the compression scheme corresponding to the compressed data set for the first data block from the encoded compression descriptor for the first data block; and
decompressing the compressed data set for the first data block to produce data values for the first data block, wherein the decompressing is performed based on the compression scheme corresponding to the compressed data set for the first data block.

24. The data processing system of claim 23, wherein data values for each of the plurality of data blocks are texture map data values.

25. The data processing system of claim 24, wherein each of the data blocks corresponds to a M-by-N texel block.

26. The data processing system of claim 25, wherein the memory includes operating instructions such that the processor performs an additional function of texturing pixels using the texture map data values for the first data block.

27. The data processing system of claim 23, wherein each encoded compression descriptor includes K bits, wherein the K bits encode $2^K$ potential compression scheme/size combinations.

28. The data processing system of claim 23, wherein the memory includes operating instructions such that the processing module performs the function of compressing each data block of the plurality of data blocks such that at least a portion of the data blocks in the plurality of data blocks are compressed using a variable length compression scheme.

29. A data processing system, comprising:
a first memory;
a second memory;
a processing module operably coupled to the first memory and the second memory; and
an instruction memory operably coupled to the processing module, wherein the instruction memory stores operating instructions that, when executed by the processing module, cause the processing module to perform functions that include:
selecting a compression scheme for each data block of a plurality of data blocks, wherein each compression scheme selected is selected from a set of predetermined compression schemes;
compressing each data block using the compression scheme selected for the data block to produce a compressed data set corresponding to each data block, wherein compressing compresses data within each data block to a size corresponding to the compression scheme selected for the data block, wherein each compression scheme supports at least one size;

storing the compressed data sets corresponding to each of the plurality of data blocks in the first memory, wherein the compressed data sets are grouped into a plurality of groups, wherein compressed data sets in each of the plurality of groups are stored in a predetermined order within the first memory; and storing a descriptor data set for each group of the plurality of groups in the second memory, wherein each descriptor data set includes a base address for the group in the first memory and an encoded compression descriptor for each compressed data set included in the group, wherein each encoded compression descriptor encodes the compression scheme and size for each compressed data set, wherein ordering of the encoded compression descriptors in the descriptor data set corresponds to ordering of the compressed data sets for the group as stored in the first memory.

30. The data processing system of claim 29, wherein the instruction memory includes instructions such that the functions performed by the processing module include decompressing the compressed data for a selected data block of the plurality of data blocks, wherein decompressing includes:

fetching a descriptor data set from the second memory that includes an encoded compression descriptor for a compressed data block that corresponds to the selected block;

determining an address of the compressed data set corresponding to the selected data block in the first memory based on the base address of the descriptor data set fetched from the second memory and sizes of other compressed data blocks as indicated by additional encoded compression descriptors included in the descriptor data set fetched;

fetching the compressed data set corresponding to the selected data block from the first memory using the address;

determining the compression scheme used for compressing the compressed data set corresponding to the selected data block based on the encoded compression descriptor corresponding to the compressed data set in the descriptor data set fetched from the second memory; and decompressing the compressed data set fetched from the first memory based on the compression scheme used for compressing the compressed data set to produce data of the selected data block.

* * * * *